Patented Aug. 4, 1936

2,049,443

UNITED STATES PATENT OFFICE 2,049,443

THERMOCOUPLE ALLOY

Otto Hermann, St. Louis, Mo.

No Drawing. Application February 21, 1935, Serial No. 7,568

1 Claim. (Cl. 136—5)

This invention relates to a thermocouple alloy.

The object of my invention is to provide a thermocouple which produces a larger quantity of electrical energy for a given quantity of heat absorbed at the hot junction of the thermocouple that is usually the case with this method of generating electric current.

By a series of experimental tests, I have found that thermoelements formed from an alloy composed of nickel and titanium are highly negative against elements composed of a copper-nickel alloy.

In producing this negative element alloy, I use nickel as the base metal for the melt and add thereto titanium as the other component part of the alloy. After having melted the nickel, I add titanium to the melt, which readily dissolves therein.

With relation to the useful thermoelectric properties, such as the thermal electromotive force, electrical conductance, thermal conductance and temperature coefficient, I have determined that the best result is obtained when the nickel-titanium alloy is prepared from ninety percent. (90%) to ninety-two percent. (92%) of nickel and from ten percent. (10%) to eight percent. (8%) of titanium. When the alloy is thus composed, it is ductile and can be forged, drawn into wire and rolled into ribbon form.

A very desirable feature is the fact that negative thermoelements formed from the nickel-titanium alloy resist oxidation at a fairly high temperature (a temperature higher than ordinary thermoelements now in use), and thus have a useful life over an extended period of time. Moreover, such negative elements are also well adapted for electric welding, and a joint thereby formed with a positive element is not impaired by its exposure to high temperatures.

A thermocouple in which the positive element is prepared from a nickel-copper alloy, and the negative element from the alloy described above, has a relatively high efficiency. This is due to its high thermal electromotive force equal to about 0.00009 volt per centigrade degree difference of temperature, and to the low ohmic resistance of the thermocouple elements not exceeding 0.000055 ohm with reference to centimeter tube for the negative element.

Another desirable property of both thermoelements is their small thermal conductivity (around .041 for the negative alloy) and their low temperature coefficient; the increase of their ohmic resistance is very small when compared with their initial resistance at ordinary temperatures.

I claim:—

A negative thermocouple alloy consisting of nickel and titanium, and a positive thermocouple alloy consisting of nickel and copper.

OTTO HERMANN.